(12) United States Patent
Samdadiya et al.

(10) Patent No.: US 8,224,904 B2
(45) Date of Patent: Jul. 17, 2012

(54) MISSED INSTANT MESSAGE NOTIFICATION

(75) Inventors: Parag Samdadiya, Bellevue, WA (US); Rajesh Ramanathan, Redmond, WA (US); Marc Boyer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1595 days.

(21) Appl. No.: 11/537,386

(22) Filed: Sep. 29, 2006

(65) Prior Publication Data

US 2008/0080677 A1   Apr. 3, 2008

(51) Int. Cl.
*G06F 15/16* (2006.01)
*H04M 1/725* (2006.01)

(52) U.S. Cl. ............ 709/206; 455/412.2; 709/219; 715/206

(58) Field of Classification Search ............... 709/219, 709/203, 217, 205–207; 455/466, 412.2; 706/47; 379/88.11, 88.12, 88.13, 88.17
See application file for complete search history.

(56) References Cited

U.S. PATENT DOCUMENTS

| | | | |
|---|---|---|---|
| 6,301,609 B1 | 10/2001 | Aravamudan et al. | |
| 6,983,305 B2 | 1/2006 | Danker et al. | |
| 7,191,213 B1 * | 3/2007 | Bouchard et al. | 709/204 |
| 7,337,210 B2 * | 2/2008 | Barsness | 709/204 |
| 7,363,344 B1 * | 4/2008 | Coletrane et al. | 709/206 |
| 7,406,501 B2 * | 7/2008 | Szeto et al. | 709/206 |
| 7,412,657 B2 * | 8/2008 | Forlenza et al. | 715/751 |
| 7,650,384 B2 * | 1/2010 | Ramanathan et al. | 709/206 |
| 7,689,657 B2 * | 3/2010 | Daniell et al. | 709/206 |
| 7,756,936 B2 * | 7/2010 | Rosenberg et al. | 709/206 |
| 7,818,375 B2 * | 10/2010 | Malik et al. | 709/206 |
| 8,001,190 B2 * | 8/2011 | Bernstein et al. | 709/206 |
| 2003/0023957 A1 * | 1/2003 | Bau et al. | 717/140 |
| 2003/0229722 A1 * | 12/2003 | Beyda | 709/310 |
| 2004/0010808 A1 | 1/2004 | deCarmo | |
| 2004/0054735 A1 * | 3/2004 | Daniell et al. | 709/206 |
| 2004/0073643 A1 * | 4/2004 | Hayes et al. | 709/223 |
| 2004/0158611 A1 * | 8/2004 | Daniell et al. | 709/206 |
| 2004/0201623 A1 | 10/2004 | Hamilton et al. | |
| 2004/0224769 A1 | 11/2004 | Hansen et al. | |
| 2005/0004984 A1 | 1/2005 | Simpson | |
| 2005/0027676 A1 | 2/2005 | Eichstaedt et al. | |
| 2005/0071433 A1 | 3/2005 | Shah | |
| 2005/0071434 A1 * | 3/2005 | Hettish et al. | 709/207 |
| 2005/0193074 A1 * | 9/2005 | Garland | 709/206 |
| 2005/0198150 A1 | 9/2005 | Werner | |
| 2006/0005133 A1 | 1/2006 | Lyle et al. | |
| 2006/0026237 A1 | 2/2006 | Wang et al. | |
| 2006/0026254 A1 | 2/2006 | Kessen et al. | |
| 2006/0041629 A1 * | 2/2006 | Lira | 709/206 |

(Continued)

OTHER PUBLICATIONS

Day, M. et al., "A Model for Presence and Instant Messaging," Network Working Group, RFC 2778, Informational, Feb. 2000, © The internet Society 2000.

(Continued)

*Primary Examiner* — Lisa Hashem
(74) *Attorney, Agent, or Firm* — Perkins Coie LLP

(57) ABSTRACT

A method and system for capturing missed communications is provided. An enhanced real-time communication system receives a communication from an initiating participant for a receiving participant that is not available. The enhanced real-time communication system detects that the receiving participant missed the received communication from the initiating participant. Upon detecting that the receiving participant missed the communication, the enhanced real-time communication system stores the missed communication for later retrieval by the receiving participant.

12 Claims, 7 Drawing Sheets

U.S. PATENT DOCUMENTS

| | | | |
|---|---|---|---|
| 2006/0075039 A1 | 4/2006 | Narayanaswami et al. | |
| 2006/0101119 A1* | 5/2006 | Qureshi et al. | 709/206 |
| 2006/0123346 A1* | 6/2006 | Totman et al. | 715/748 |
| 2006/0168073 A1* | 7/2006 | Kogan et al. | 709/206 |
| 2006/0248157 A1* | 11/2006 | Daniell et al. | 709/207 |
| 2007/0121808 A1* | 5/2007 | Brunson et al. | 379/67.1 |
| 2007/0225017 A1* | 9/2007 | Li et al. | 455/456.1 |
| 2008/0051064 A1* | 2/2008 | Jones et al. | 455/412.2 |
| 2008/0250107 A1* | 10/2008 | Holzer et al. | 709/206 |
| 2009/0043848 A1* | 2/2009 | Kordun | 709/205 |
| 2009/0113342 A1* | 4/2009 | Bank et al. | 715/808 |
| 2009/0119373 A1* | 5/2009 | Denner et al. | 709/206 |
| 2009/0132661 A1* | 5/2009 | Kao et al. | 709/206 |
| 2009/0280843 A1* | 11/2009 | Wisebourt et al. | 455/466 |
| 2010/0198925 A1* | 8/2010 | Katis et al. | 709/206 |
| 2010/0293239 A1* | 11/2010 | Cross et al. | 709/206 |

OTHER PUBLICATIONS

Greene, Derek and O'Mahony, Donal, "Instant Messaging & Presence Management in Mobile Ad-Hoc Networks," Second IEEE Annual Conference on Pervasive Computing and Communications Workshops, 2004, https://www.cs.tcd.ie/~omahony/MP2P_01_Greene_D.pdf.

Hindocha, Neal, "Threats to Instant Messaging," 2002, http://enscenter.future.co.kr/resource/sc-center/vendor-wp/symantec/ThreatsToIM.pdf.

Isaacs, Ellen et al., "Hubbub: A sound-entranced mobile instant messenger that supports awareness and opportunistic interactions," CHI 2002, Volume No. 4, Issue No. 1, pp. 179-186, Apr. 20-25, 2002, Minnesota, © 2002 ACM.

Mannan, Mohammad and P.C. van Corschot, "Secure Public Instant Messaging: A Survey," Sep. 17, 2004, Proceedings of the 2nd Annual Conference on Privacy, Security and Trust, Fredericton, NB, Oct. 13-15, 2004, http://www.scs.carleton.ca/~mmannan/publications/pst04.pdf.

Nardi, Bonnie A. et al., "Interaction and Outeraction: Instant Messaging in Action," CSCW00, Dec. 2-6, 2000, Philadelphia, PA, pp. 79-88, © 2000 ACM.

Rosenberg, J. "A Presence Event Package for the Session Initiation Protocol (SIP)," Network Working Group, RFC 3856, Standards Track, Aug. 2004, © The Internet Society 2004.

Yahoo! Messenger, http://webmessenger.yahoo.com/, [last accessed May 29, 2007].

\* cited by examiner

MISSED INSTANT MESSAGE NOTIFICATION

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computing devices of the intended participants are currently powered off, then a real-time conversation may not be possible. Moreover, if their computing devices are currently powered on, but the intended participants are away from their computing devices, a real-time conversation is also not possible.

Presence services provide availability information of users so that an appropriate decision on the form of communication can be made by an initiating participant. The availability status of an entity such as a computing device or a user associated with a computing device is referred to as "presence information." Presence information identifies the current "presence state" of the user. Users make their presence information available to a presence service so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computing device in a meeting. In such a case, the presence state may indicate "online" and "in a meeting."

A presence service may provide a presence server for distributing presence information. A publishing user ("publisher") may run client software that provides their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's client software and in turn notifies the subscribing users of the change. A subscribing user can then decide whether to initiate a real-time communication and the type to initiate based on the presence information of the intended participants. For example, if the presence information indicates that a publishing user is currently in a conference telephone call, then the subscribing user may decide to send an instant message, rather than place a telephone call, to the publishing user. RFC 2778, entitled "A Model for Presence and Instant Messaging," is a specification relating to presence information in instant messaging systems. RFC 3856, entitled "A Presence Event Package for the Session Initiation Protocol," is a specification relating to presence information using the Session Initiation Protocol ("SIP").

In many circumstances, a receiving participant appears to be available such that an initiating participant will send the receiving participant a message and attempt to start a conversation, when the receiving participant is not in fact available to receive the communication. In such circumstances, the message sent by the initiating participant is lost without ever reaching the receiving participant. For example, when the receiving participant has just stepped away from his desk, the initiating participant's client software may still indicate that the receiving participant is available, and the initiating participant may send a message to the receiving participant. The receiving participant's client software may receive the message and display it briefly through a notification window (sometimes called a "toast"), or by creating a conversation window. However, the receiving participant may never see the message. Likewise, the initiating participant may assume that the message was seen by the receiving participant, and have no indication to the contrary. The receiving participant may miss important information conveyed by the missed message, such as a new location for an upcoming meeting.

SUMMARY

A method and system for capturing missed communications and for providing an indication to initiating participants that a communication was missed is provided. An enhanced real-time communication system receives a communication from an initiating participant for a receiving participant that is not available. The enhanced real-time communication system detects that the receiving participant missed the received communication from the initiating participant. Upon detecting that the receiving participant missed the communication, the enhanced real-time communication system stores the missed communication for later retrieval by the receiving participant. The system may also provide an indication to the initiating participant that the communication was missed, such as by providing an indication in the client software used by the initiating participant.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
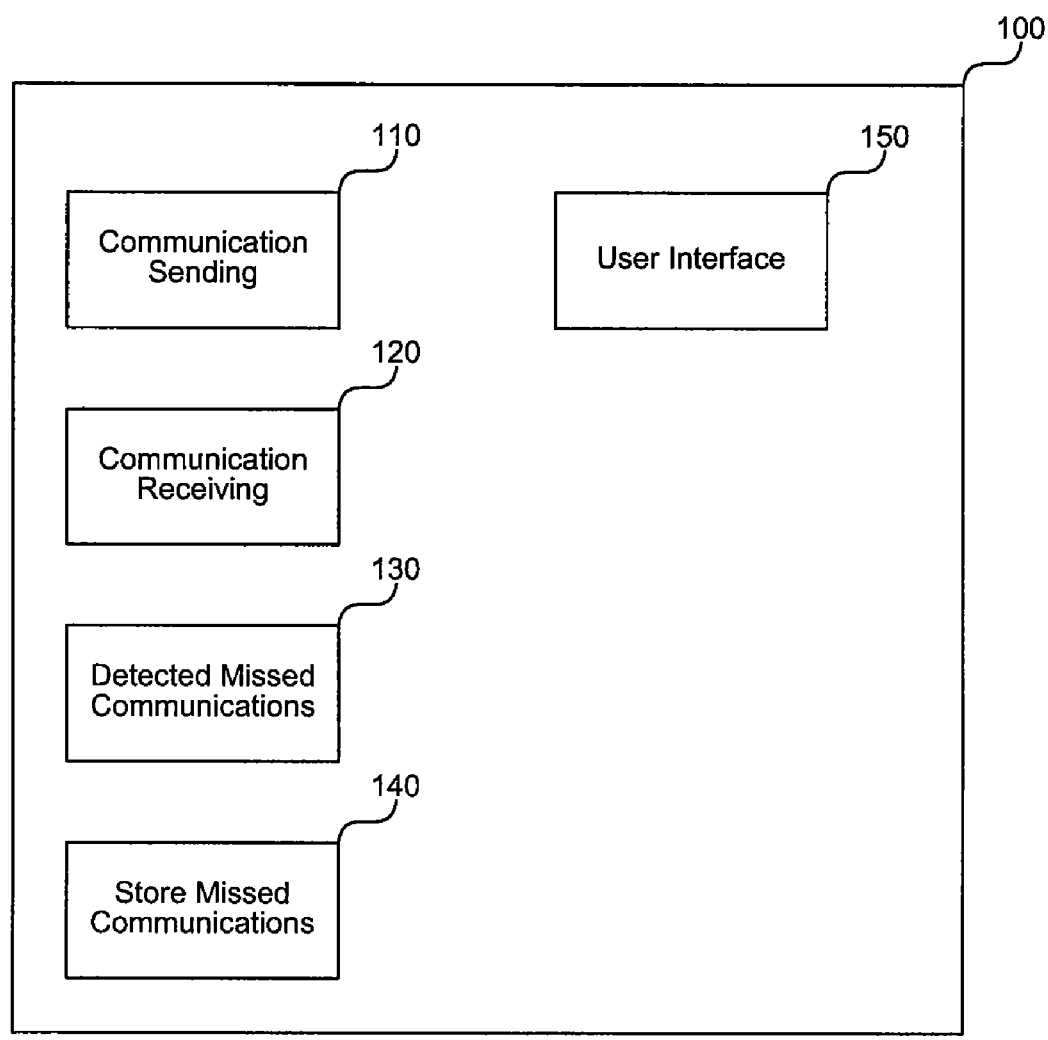
FIG. 1 is a block diagram that illustrates components of the enhanced real-time communication system in one embodiment.

A method and system for capturing missed communications and for providing an indication to initiating participants that a communication was missed is provided. An enhanced real-time communication system receives a communication from an initiating participant for a receiving participant that misses the communication. A receiving participant may miss a communication for a variety of reasons. For example, the receiving participant's computing device may be locked or displaying a screen saver. If the receiving participant is using multiple computing devices, such as a desktop and a laptop, the receiving participant may have recently switched from one computing device to the other, such that the computing device that the receiving participant is no longer using still accepts received communications. The receiving participant may also miss a communication by explicitly dismissing a notification to join a conversation. Alternatively, the receiving participant may simply be ignoring communications altogether. The enhanced real-time communication system detects that the receiving participant missed the received communication from the initiating participant. For example, the system may observe that the receiving participant dismissed a conversation notification window, or that the receiving participant did not respond to a received communication for a certain period, and determine that the receiving participant missed the communication. Upon detecting that the receiving participant missed the communication, the enhanced real-time communication system stores the missed communication for later retrieval by the receiving participant. For example, the system may send the communication to the receiving participant as an electronic mail message that the receiving participant can retrieve and read later. The system may also provide an indication to the initiating participant that the communication was missed by the receiving participant, such as by displaying a notification icon to the initiating participant. In this way, the enhanced real-time communication system provides a way for a receiving participant to retrieve missed communications and for an initiating participant to be aware when the receiving participant misses a communication.

In some embodiments, the enhanced real-time communication system may store missed communications in an email server. For example, the real-time communication system may create a "Conversation History" folder in the receiving participant's electronic mailbox, and store missed communications as messages in the folder. The receiving participant can then access the missed communications by navigating to the folder using an email client. If the email server provides a web interface, then the receiving participant may be able to access missed messages from any computing device with a web browser.

In some embodiments, the enhanced real-time communication system stores missed communications in a format similar to email. For example, a missed communication may have a sender field, recipient, time sent, subject, and other fields commonly associated with email. Missed communications may contain many types of content such as video, audio, text, images, and other media. The missed communication stored by the enhanced real-time communication system may contain all of the content contained in the original communication. For example, if the initiating participant sends a message using a webcam that contains video and audio data in addition to a text message, the missed communication may be stored with the text in the body of the message and the video and audio data as attachments to the message. The receiving participant may also be able to resume the conversation by replying to the missed communication, similar to replying to an email. The receiving participant may also reply by initiating a phone call, or the stored missed communication may contain a link that opens a new instant messaging conversation with the original initiating participant, thereby allowing the participants to pick up the conversation where it left off.

In some embodiments, the enhanced real-time communication system assigns a unique conversation identifier to each message that is part of the same conversation. For example, an initiating participant may send an instant message to a receiving participant that the receiving participant misses, and the enhanced real-time communication system stores a missed message email and assigns a conversation identifier (e.g., 22 bytes) to the email. If the receiving participant creates a new email message in reply to the missed message email, the system assigns the conversation identifier to the new message so that the message can be identified as part of the same conversation. The system may also append an action identifier (e.g., 5 bytes) to the conversation identifier as each subsequent action is taken such that a history of actions in a conversation can be tracked.

In some embodiments, the enhanced real-time communication system provides an indication when a communication is missed. The system may provide a graphical indicator in the client software of the receiving participant that alerts the receiving participant to the presence of new missed messages that the receiving participant should read. The system may also provide an indication to the initiating participant to indicate that a message that was sent was missed by the receiving participant. For example, if the initiating participant sends a message to a receiving participant, and the system detects that the receiving participant's screen saver is active, the system may alert the initiating participant that the receiving participant missed the message. In this way, the initiating participant will not rely on the receiving participant's having seen the message, and the initiating participant can try another method of communication such as calling the receiving participant to attempt to successfully deliver the message.

In some embodiments, the enhanced real-time communication system waits a certain amount of time after a missed message has been received to determine if other missed communications are part of the same conversation. For example, an initiating participant may send several instant messages to a receiving participant one after the other, without receiving replies to any of the instant messages. If the system determines that the receiving participant missed the first message, then the system may wait to see if other messages arrive that may also be missed. It may be more convenient for the receiving participant to receive one missed instant message email containing all of the missed communications rather than receiving multiple missed instant message emails each containing only one of the missed communications. The amount of time that the system waits may be a set predetermined amount, or may be determined dynamically such as by observing the average amount of time between messages.

In some embodiments, a presence or other server detects that a communication has been missed. For example, a presence server may detect that an initiating participant has sent a communication to a receiving participant that has not been replied to for a certain period and determine that the communication has been missed by the receiving participant. As another example, the server may detect that one participant has closed the conversation before the other participant has replied or that one participant has sent a communication while the other participant's presence state indicates that the participant will miss the communication. The server may also create a missed communication message and send it to the receiving participant by email or other mode of communication upon detecting the missed communication.

The following paragraphs describe various embodiments of the invention as described above with reference to the figures.

FIG. 1 is a block diagram that illustrates components of the enhanced real-time communication system in one embodiment. The enhanced real-time communication system 100 contains a communication sending component 110, a communication receiving component 120, a detect missed communications component 130, a store missed communications component 140, and a user interface component 150. The communication sending component 110 sends communications from an initiating participant to a receiving participant. The communication receiving component 120 receives communications sent by the communication sending component 110. The detect missed communications component 130 determines when a sent communication has been missed by the intended recipient. The store missed communications component 140 groups missed communications that are part of the same conversation and stores them for later retrieval by the intended recipient. The user interface component 150 displays indications to participants, such as to inform a receiving participant that there are new missed communications, or to inform an initiating participant that a sent communication was missed by the intended recipient.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
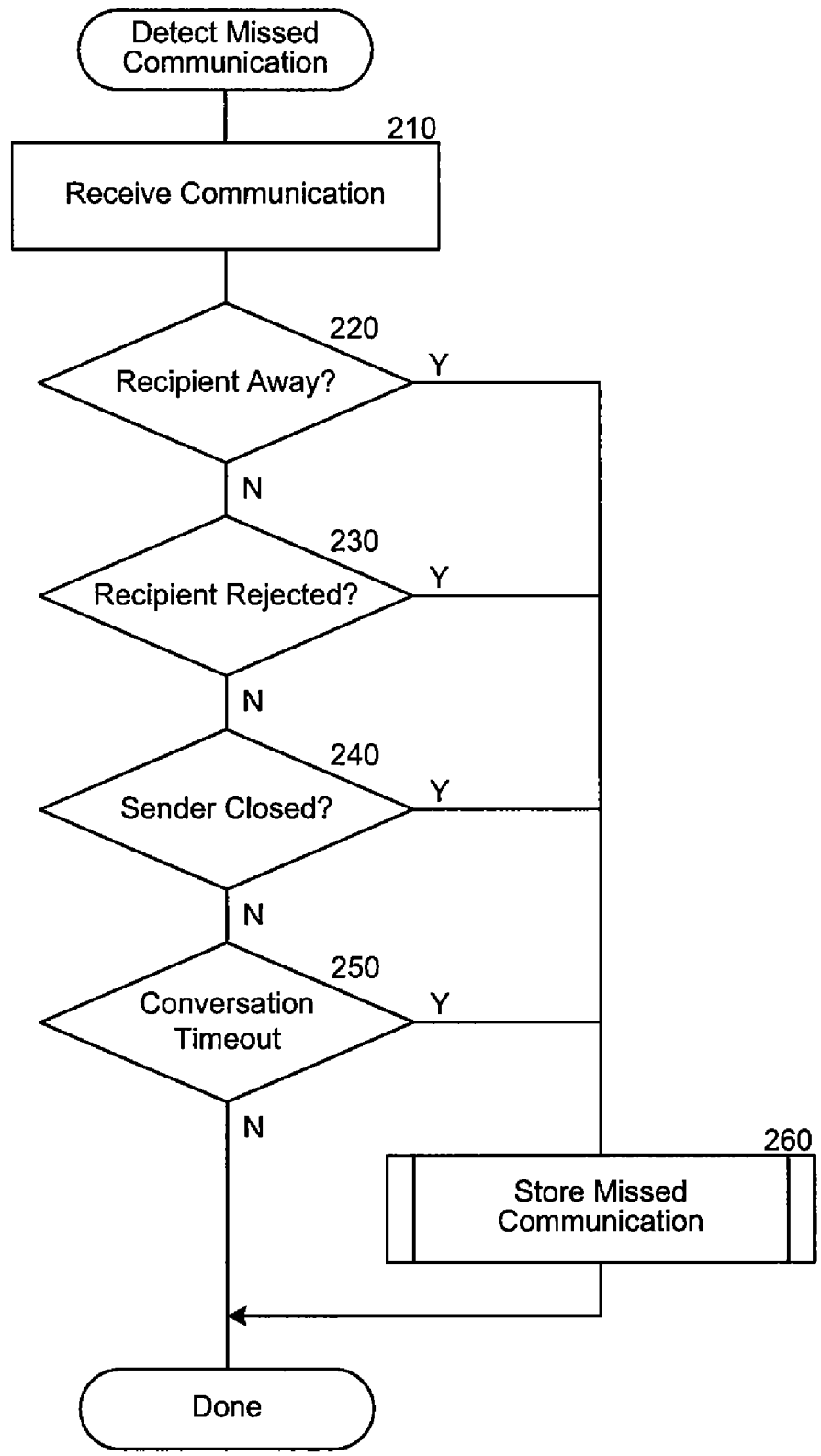
FIG. 2 is a flow diagram that illustrates the processing of the detect missed communications component of the system in one embodiment.

FIG. 2 is a flow diagram that illustrates the processing of the detect missed communications component of the system in one embodiment. The component is invoked at various times, such as after a communication is received or after a certain amount of time has elapsed to determine whether the intended recipient missed the communication. In block 210, the component receives a communication from an initiating participant. In decision block 220, if the recipient is away, then the component continues at block 260, else the component continues at block 230. The component may determine that the recipient is away, for example, by detecting that a screen saver is running at the recipient's client computer, by detecting that the client computer is locked, or by detecting that the user's status is set to "Away" or "Busy." In decision block 230, if the recipient rejected the communication, then the component continues at block 260, else the component continues at block 240. The recipient may reject the communication, for example, by dismissing a toast notification announcing the communication, or by closing a conversation window related to the communication before sending a reply. In decision block 240, if the sender of the communication closes the conversation window at his client computer before the recipient has replied, then the component continues at block 260, else the component continues at block 250. In decision block 250, if the conversation times out, then the component continues at block 260, else the component completes. A conversation may time out, for example, if one participant has not typed a message for a certain amount of time. In block 260, the component stores the missed communication for later retrieval by the recipient. The component then completes.

Figure 3:
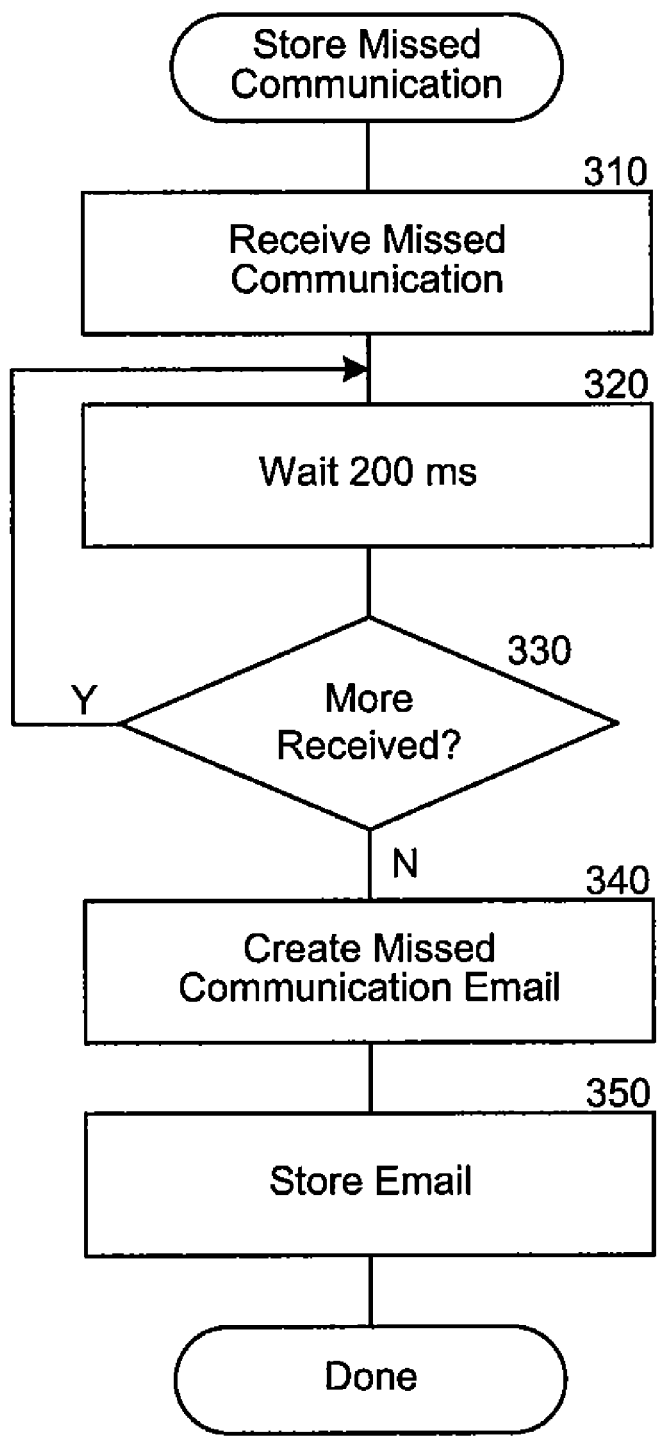
FIG. 3 is a flow diagram that illustrates the processing of the store missed communications component of the system in one embodiment.

FIG. 3 is a flow diagram that illustrates the processing of the store missed communications component of the system in one embodiment. The component is invoked after the system has determined that a communication has been missed to store the missed communication and any related communications. In block 310, the component receives the missed communication. In block 320, the component waits for a certain amount of time, for example, 200 ms, to allow additional related communications to be received. In decision block 330, if an additional related communication was received, then the component loops to block 320 to wait for additional related communications, else the component continues at block 340. In block 340, the component creates a missed communication email containing the content of the missed communication, as well as relevant details about the communication, such as the sender, time sent, and other information. The component may also assign a unique conversation identifier to the missed communication email. In block 350, the component stores the missed communication email for later retrieval by the recipient, such as in the recipient's electronic mailbox. The component then completes.

Figure 4:
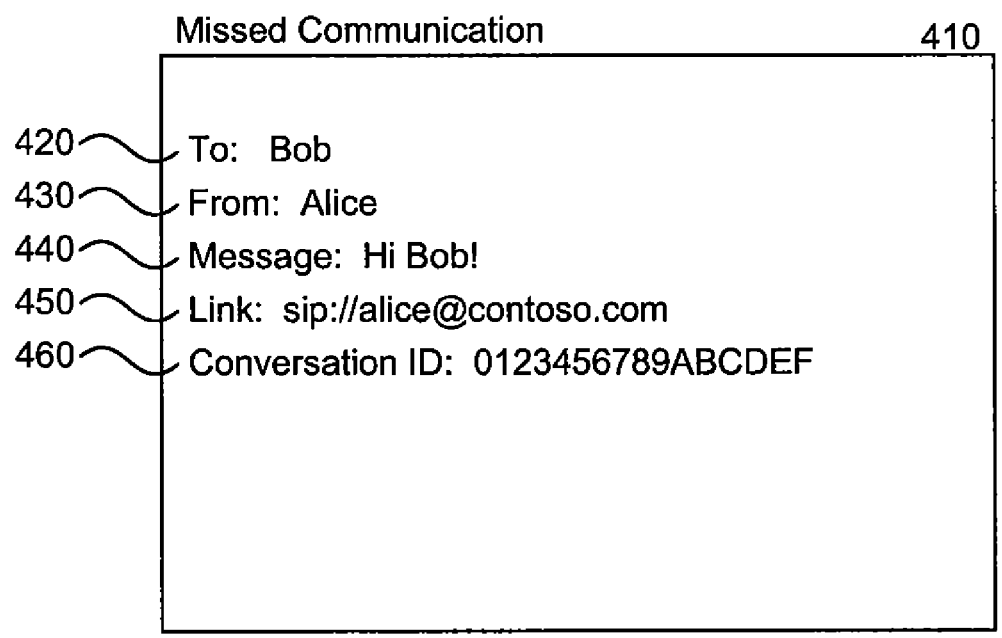
FIG. 4 illustrates a data structure used to store missed communications in one embodiment.

FIG. 4 illustrates a data structure used to store missed communications in one embodiment. The data structure 410 contains a "To" field 420, "From" field 430, "Message" field 440, "Link" field 450, and "Conversation ID" field 460. The "To" field 420 stores the name and/or address of the intended recipient of the missed communication. The "From" field 430 stores the name and/or address of the sender of the missed communication. The "Message" field 440 stores the content of the message, such as text, audio, or video data related to the communication. The "Link" field 450 contains a link that can be activated by the recipient to restart the conversation. The "Conversation ID" field 460 contains a unique identifier that is associated with any communication that becomes part of the conversation, such as if the recipient restarts the conversation by replying to the missed communication email.

Figure 5:
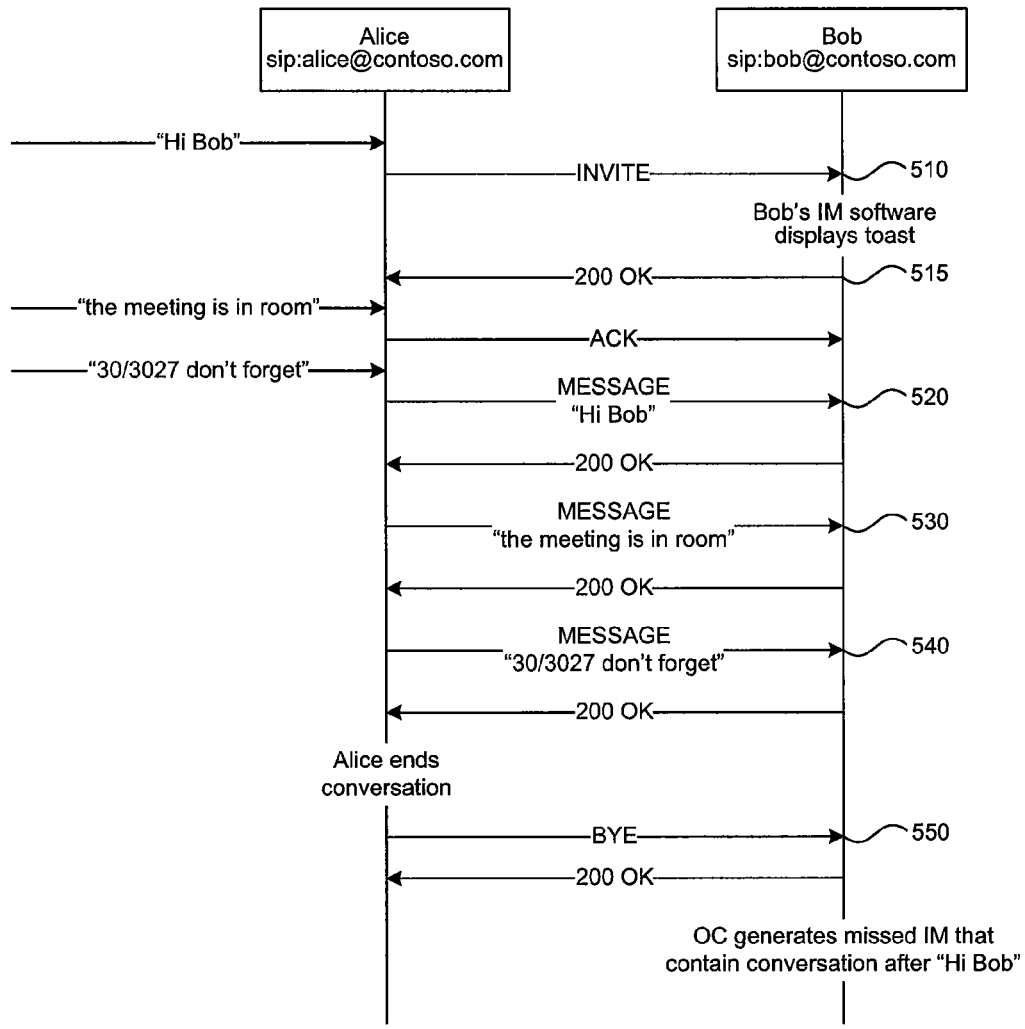
FIG. 5 illustrates the network traffic and associated actions that occur when a missed communication is detected by the sender terminating the conversation in one embodiment.

FIG. 5 illustrates the network traffic and associated actions that occur when a missed communication is detected by the sender terminating the conversation in one embodiment. First, Alice opens a conversation window and sends three messages in a row to Bob. After the first message is entered, Alice's client software sends a SIP INVITE 510 to Bob's client software to initiate a SIP conversation. Then, Alice's client software begins sending the first 520, second 530, and third 540 messages to Bob's client software. Bob's computer is locked since he is away from his desk. Bob's client software automatically accepts the SIP INVITE by sending a "200 OK" reply 515, and displays a toast notification containing the text of the first message. Next, Alice closes the conversation window, and Alice's client software sends a SIP BYE message 550 to Bob's client software. Bob's client software detects that Bob has missed the received messages and creates a missed communication email containing the messages for Bob to retrieve later.

Figure 6:
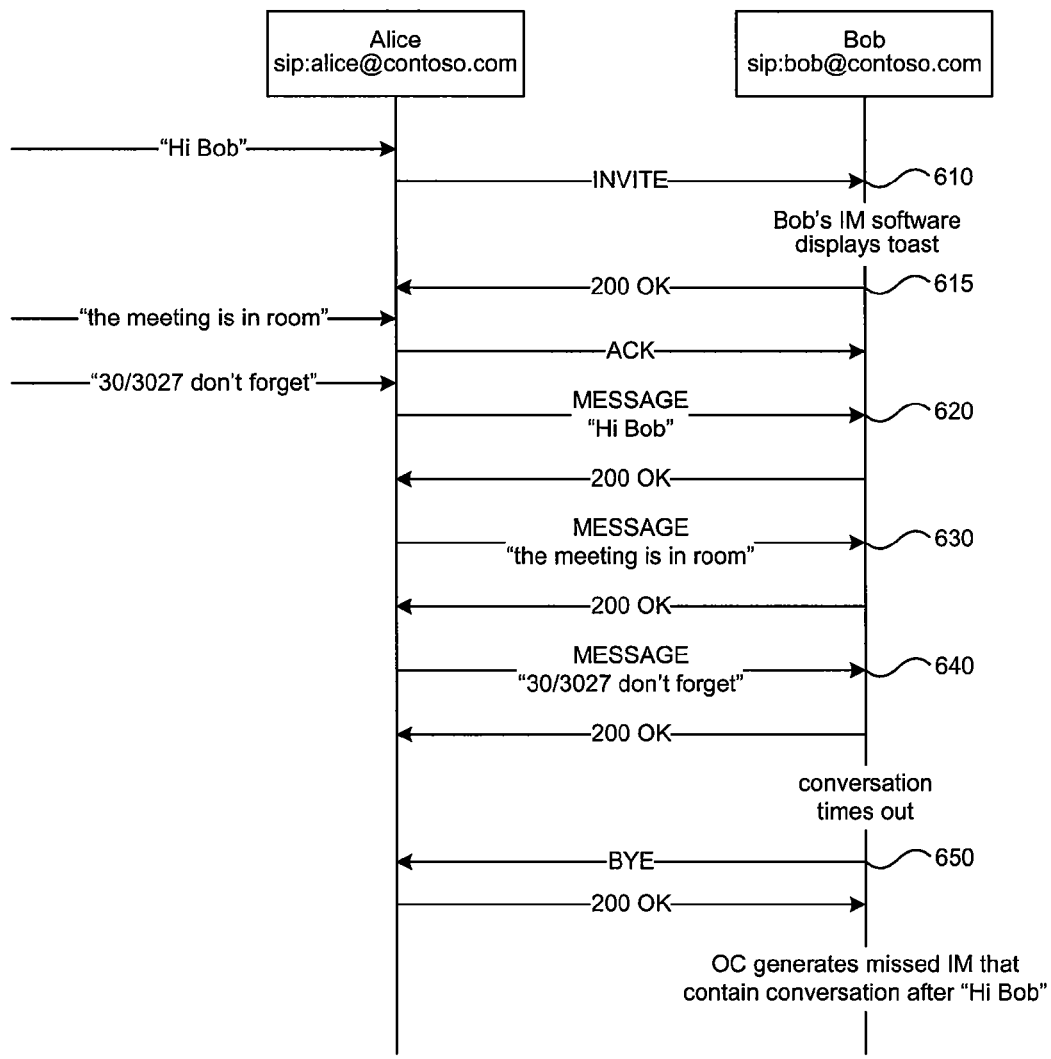
FIG. 6 illustrates the network traffic and associated actions that occur when a missed communication is detected by an idle timeout expiring in one embodiment.

FIG. 6 illustrates the network traffic and associated actions that occur when a missed communication is detected by an idle timeout expiring in one embodiment. First, Alice opens a conversation window and sends three messages in a row to Bob. After the first message is entered, Alice's client software sends a SIP INVITE 610 to Bob's client software to initiate a SIP conversation. Then, Alice's client software begins sending the first 620, second 630, and third 640 messages to Bob's client software. Bob's computer is locked since he is away from his desk. Bob's client software automatically accepts the SIP INVITE by sending a "200 OK" reply 615, and displays a toast notification containing the text of the first message. Sometime later, Bob's client software determines that the conversation has timed out, and sends a SIP BYE message 650 to Alice's client software. Bob's client software detects that Bob has missed the received messages and creates a missed communication email containing the messages for Bob to retrieve later.

Figure 7:
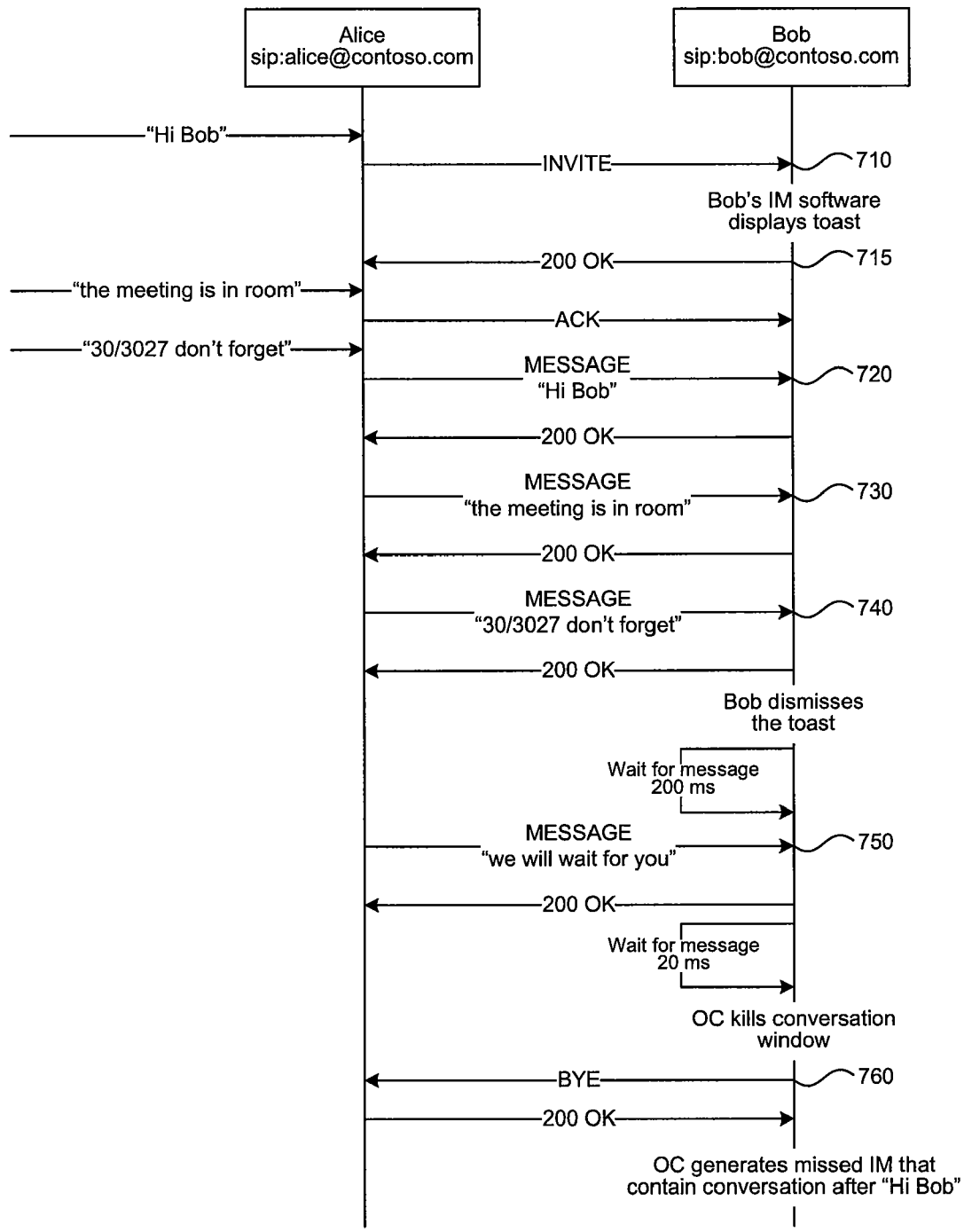
FIG. 7 illustrates the network traffic and associated actions that occur when a missed communication is detected by the recipient explicitly rejecting the conversation in one embodiment.

FIG. 7 illustrates the network traffic and associated actions that occur when a missed communication is detected by the recipient explicitly rejecting the conversation in one embodiment. First, Alice opens a conversation window and sends three messages in a row to Bob. After the first message is entered, Alice's client software sends a SIP INVITE 710 to Bob's client software to initiate a SIP conversation. Then, Alice's client software begins sending the first 720, second 730, and third 740 messages to Bob's client software. Bob's client software automatically accepts the SIP INVITE by sending a "200 OK" reply 715, and displays a toast notification containing the text of the first message. Bob sees the toast and rejects the conversation by dismissing the toast notification, such as by clicking a close button on the toast notification. Although Bob's client software detects that Bob has missed the received messages, Bob's client software keeps the conversation open for a certain period waiting for additional missed messages. Alice sends an additional message 750 to Bob within the period, and Bob's client software again waits for the period to expire before determining that the conversation has ended. Then, Bob's client software closes the conversation by sending a SIP BYE message 760 to Alice's client software. Bob's client software creates a missed communication email containing all of the messages for Bob to retrieve later.

From the foregoing, it will be appreciated that specific embodiments of the enhanced real-time communication system have been described herein for purposes of illustration, but that various modifications may be made without deviating from the spirit and scope of the invention. For example, although instant messaging has been described, other forms of real-time communication such as a phone call, VoIP call, webcam chat, or other forms of communication may also be captured by the system as missed communications. Accordingly, the invention is not limited except as by the appended claims.

We claim:

1. A computer system for capturing missed instant messages, comprising:
    a communication receiving component for receiving communications from an initiating participant directed to a recipient, the communications being instant messages of a conversation;
    a detect missed communications component for detecting that the recipient missed a received communication;
    a component for, after detecting that the recipient missed the communication, assigning a unique conversation identifier to the missed communication;
    a store missed communications component for storing an indication that the missed communication was missed along with the assigned unique conversation identifier as a missed communication electronic mail message wherein multiple missed communications from the initiating participant to the recipient are stored in the electronic mail message along with a link for opening an instant messaging conversation with the initiating participant so that the recipient and the initiating participant can continue where the conversation left off; and
    a component for, when the recipient indicates to reply to the missed communication electronic mail message with a new electronic mail message, assigning the unique conversation identifier of the missed communication to the new electronic mail message so that the new electronic mail message can be identified as part of the same conversation as the missed communication.

2. The system of claim 1 including a user interface component for indicating to the recipient that a communication has been missed.

3. The system of claim 1 including a user interface component for indicating to the initiating participant that a communication has been missed.

4. The system of claim 1 wherein the detect missed communications component determines that the recipient dismissed a notification.

5. The system of claim 1 wherein the detect missed communications component determines that the recipient closed a conversation window related to the communication.

6. The system of claim 1 wherein the detect missed communications component determines that the initiating participant closed a conversation related to the communication before the recipient responded to the communication.

7. A computer-readable storage device containing computer-executable instructions, that are not being transmitted via a signal, for controlling a computing device to capture missed instant messages, the computer-executable instructions for performing a method comprising:
    receiving communications from an initiating participant directed to a recipient, the communications being instant messages of a conversation;
    detecting that the recipient missed a received communication;
    after detecting that the recipient missed the communication, assigning a unique conversation identifier to the missed communication;
    storing an indication that the missed communication was missed along with the assigned unique conversation identifier as a missed communication electronic mail message wherein multiple missed communications from the initiating participant to the recipient are stored in the electronic mail message along with a link for opening an instant messaging conversation with the initiating participant so that the recipient and the initiating participant can continue where the conversation left off; and when the recipient indicates to reply to the missed communication electronic mail message with a new electronic mail message, assigning the unique conversation identifier of the missed communication to the new electronic mail message so that the new electronic mail message can be identified as part of the same conversation as the missed communication.

8. The computer-readable storage device of claim 7 including indicating to the recipient that a communication has been missed.

9. The computer-readable storage device of claim 7 including indicating to the initiating participant that a communication has been missed.

10. The computer-readable storage device of claim 7 wherein the detecting includes determining that the recipient dismissed a notification.

11. The computer-readable storage device of claim 7 wherein the detecting includes determining that the recipient closed a conversation window related to the communication.

12. The computer-readable storage device of claim 7 wherein the detecting includes determining that the initiating participant closed a conversation related to the communication before the recipient responded to the communication.

* * * * *